May 10, 1966 W. M. HALSTEAD 3,250,453
POCKET TYPE SOLDER DISPENSER
Filed April 17, 1964
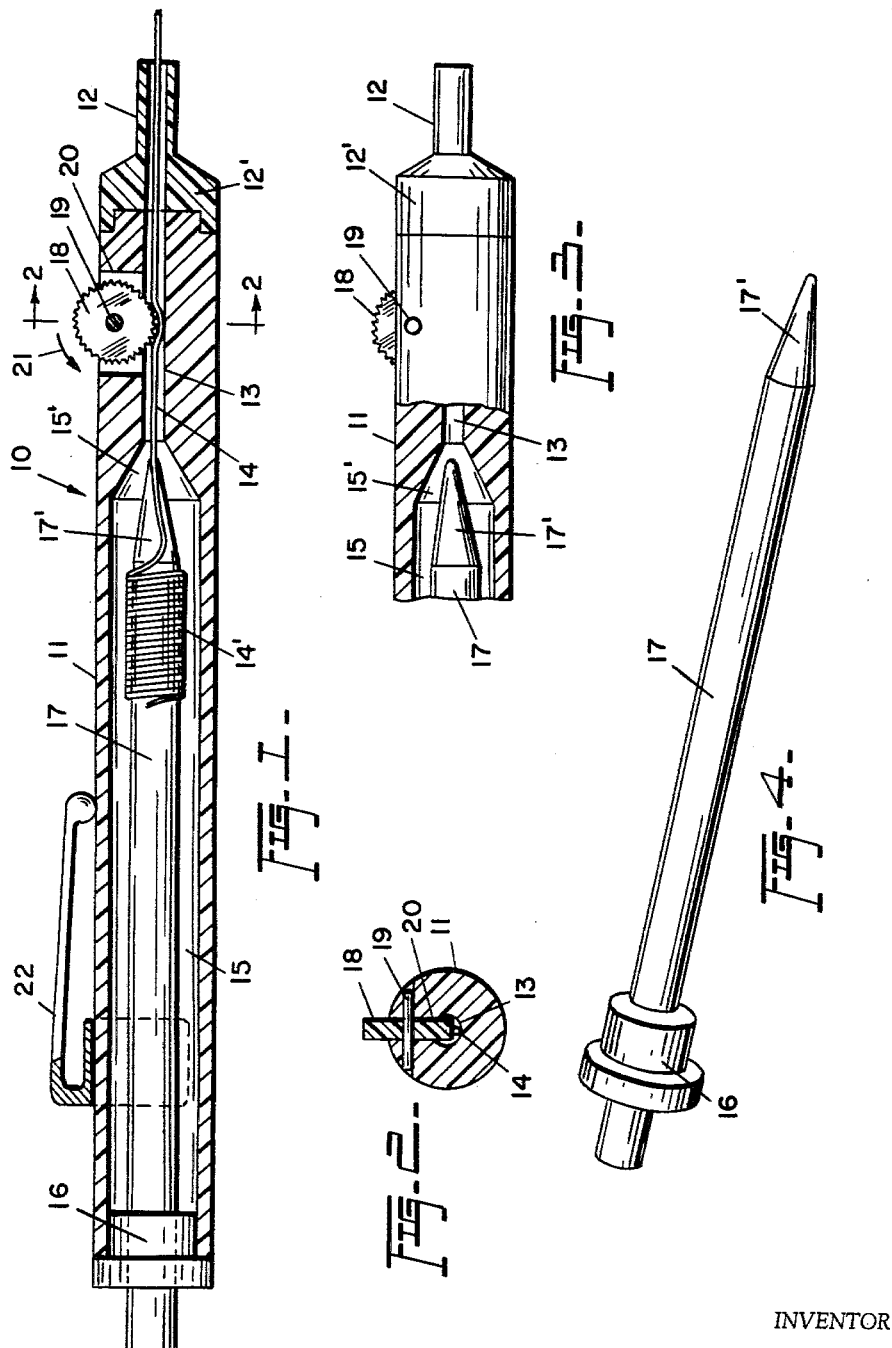
INVENTOR
WILLIAM M. HALSTEAD
BY Munson H. Lane
ATTORNEY

United States Patent Office 3,250,453
Patented May 10, 1966

3,250,453
POCKET TYPE SOLDER DISPENSER
William M. Halstead, P.O. Box 195,
Linthicum Heights, Md.
Filed Apr. 17, 1964, Ser. No. 360,527
8 Claims. (Cl. 228—52)

This invention relates to new and useful improvements in dispensers for wire solder, particularly relatively thin, flexible and thread-like solder such as is used by technicians in assembling or repairing electronic or electrical components of radios, television sets, computers, and the like.

The principal object of the invention is to provide a pocket type solder dispenser which may be conveniently and expeditiously employed for feeding solder to the work, the dispenser being an easily manipulated, fully self-contained entity with a supply of solder embodied therein, such solder being dispensed in such quantities and at such rates of feed as demanded by the work involved, and the dispenser as a whole being conveniently carried in the technician's pocket in the manner of a pocket pen or pencil, so that it is instantly available for use when desired.

Another object of the invention is to provide a solder dispenser of the type above outlined which is especially adapted for use in electrical or electronic work where residual high potential may be present even after the source of current supply has been disconnected, the dispenser being so constructed as to positively safeguard the technician against electrical shock arising either from contact of the dispenser with electrified components, or from flow of electric current through the solder itself into the dispenser held by the technician's hand.

Other advantages of the invention reside in its simplicity of construction, efficient and dependable operation, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts throughout the several views, and wherein:

FIGURE 1 is a longitudinal sectional view of a solder dispenser in accordance with the invention;

FIGURE 2 is a cross-sectional view, taken substantially in the plane of the line 2—2 in FIGURE 1;

FIGURE 3 is a fragmentary view, partly in side elevation and partly in section, showing the dispenser structure with the solder omitted; and FIGURE 4 is a perspective view of the mandrel and closure plug used in the invention.

Referring now to the accompanying drawings in detail, the solder dispenser of the invention is designated generally by the reference numeral 10 and embodies in its construction an elongated, slender cylindrical body 11 which is provided at one end thereof with a tubular dispensing neck or outlet neck 12, the end portion of the body adjacent the neck being formed with an axial passage 13 which extends through the neck 12 and through which wire solder indicated at 14 may be fed to the work.

The remaining portion of the body 11 is formed with a cylindrical chamber 15 which has a frusto-conical inner end 15' tapering toward and in communication with the passage 13, while the outer end of the chamber 15 is closed by means of a removable closure plug 16.

A cylindrical mandrel 17 extends through and is suitably secured in the plug 16, the mandrel having a tapered inner end portion 17' which projects into the frusto-conical inner end 15' of the chamber 15 when the plug 16 is inserted in the outer end of the body 11 and the mandrel 17 is disposed longitudinally in the chamber 15, coaxially with the passage 13, as shown.

The solder 14 is of a relatively thin, flexible, thread-like form, a supply thereof, indicated at 14', being wound helically around the mandrel 17 before the mandrel is inserted in the chamber 15, with an end portion of the solder being inserted into the passage 13 for dispensing through the outlet neck 12.

As shown, feeding of the solder may be effected by a finger-operated wheel 18 which is rotatably mounted on a transverse shaft 19 in a recess 20 formed in the portion of the body 11 adjacent the neck 12, the wheel 18 being peripherally knurled or toothed and projecting into the passage 13 for frictional engagement with the solder 14, so that when the wheel is turned in the direction of the arrow 21, the solder 14 may be fed outwardly through the neck 12 to the work. It will be understood that the solder supply 14' is wound quite loosely around the mandrel 17 so that it may readily unwind therefrom in an axial direction and pass through the passage 13 when the wheel 18 is turned in the direction of the arrow 21. Also, if more than the required amount of solder should be drawn, the same may be returned to the supply by rotating the wheel 18 in the opposite direction. In such event, the frusto-conical end 15' of the chamber 15 will coact with the tapered end portion 17' of the mandrel 17 in helically winding the unused solder back on the mandrel. It may also be noted that while the solder supply 14' is still in existence, the mandrel 17 may be withdrawn from the chamber 15 (together with the associated plug 16) while the helically wound solder supply remains in the chamber, whereupon the mandrel may be reinserted into the chamber, as desired. When the solder supply is initially provided, it is either wound helically around the mandrel or slid thereon in the form of an already wound helix, after which the end of the solder is inserted in the passage 13 while the mandrel with the solder supply thereon is inserted into the chamber 15.

It is significant to note that the outlet neck 12 is formed from heat resistant, electrically insulating material, such as for example, from material which is commercially known as "Teflon." This not only protects the outlet neck from damage by heat incident to soldering operations, but it also prevents electrical shock from being transmitted from the work to the user of the dispenser. The body 11 may be formed from any suitable material, although clear plastic is preferred so that the amount of solder remaining in the solder supply 14' may be observed. Although the neck 12 may be formed integrally with the body 11, it is shown as a separate entity with an integral neck adapter 12' pressed onto the end of the dispenser body 11.

It is also significant that the feed wheel 18 and the mandrel 17 are formed from electrically insulating material, preferably from material which is commercially known as "Nylon," so that electric charges with which the solder may come in contact at the work site are not conveyed to the user's hand by which the dispenser is held and operated. When the mandrel 17 is withdrawn from the chamber 15 as already mentioned, it may be used in the manner of a probe among electrical or electronic components and wiring, the insulating material from which the mandrel is made providing assurance that electric shocks do not reach the user's hand in the course of the probing operation. The intermediate portion of the dispenser body 11 is provided with a conventional resilient clip 22, whereby the entire device may be held in the pocket of the technician while not in use.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the appended claims.

What is claimed as new is:

1. A solder dispenser, comprising an elongated slender body provided at one end thereof with an outlet neck and formed in said one end portion with a longitudinal passage extending through said neck, the remaining portion of said body being formed with a solder supply chamber having an inner end in communication with said passage and an outer end, the inner end of said chamber being tapered toward said passage, a mandrel positioned in said chamber and extending longitudinally thereof and having a tapered end portion extending into the tapered end of said chamber, a supply of solder wound upon said mandrel and passing from said supply into said passage, and means for feeding the solder outwardly through said neck.

2. The device as defined in claim 1 together with a pocket clip provided on said body.

3. The device as defined in claim 1 wherein said outlet neck is formed from heat resistant and electrically insulating material.

4. A solder dispenser as defined in claim 1 wherein the solder feeding means comprises a finger-operated wheel.

5. The device as defined in claim 4 wherein said finger-operated wheel is formed from electrically insulating material.

6. The device as defined in claim 4 wherein said body is formed with a recess communicating with said passage, and a shaft mounted transversely in said recess, said finger-operated wheel being positioned on said shaft and projecting outwardly from said recess.

7. The device as defined in claim 6 wherein the solder supply chamber is provided with a removable closure at its outer end and said mandrel is connected to and removable with said closure.

8. A pocket type solder dispenser, comprising in combination an elongated slender body provided at one end thereof with an outlet neck and formed in said one end portion with a longitudinal passage extending through said neck, the remaining portion of said body being formed with a cylindrical chamber having an inner end in communication with said passage and an outer end, a removable closure for the outer end of said chamber, a supply of wire solder provided in said chamber, said solder passing from said supply into said passage, and a finger-operated wheel rotatably mounted in said one end portion of said body and projecting into said passage for frictionally engaging the solder therein and feeding the solder outwardly through said neck, together with a cylindrical mandrel removably positioned in said chamber and extending longitudinally thereof, said supply of solder being wound helically on said mandrel and discharged in an axial direction therefrom into said passage, said inner end of said chamber being frusto-conical and convergent toward said passage, said mandrel having a tapered end portion extending into the frusto-conical end of said chamber.

References Cited by the Examiner
FOREIGN PATENTS

| | | |
|---|---|---|
| 379,558 | 8/1923 | Germany. |
| 1,060,222 | 6/1959 | Germany. |
| 481,669 | 3/1938 | Great Britain. |
| 279,700 | 11/1927 | Great Britain. |
| 612,034 | 11/1948 | Great Britain. |

WHITMORE A. WILTZ, *Primary Examiner.*

M. L. FAIGUS, *Examiner.*